(12) United States Patent
Ren

(10) Patent No.: US 8,600,229 B2
(45) Date of Patent: Dec. 3, 2013

(54) METHOD AND SYSTEM FOR SHARED PROTECTION IN WAVELENGTH DIVISION MULTIPLEXING LOOP NETWORK

(75) Inventor: Kai Ren, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 287 days.

(21) Appl. No.: 13/054,457

(22) PCT Filed: Jul. 15, 2009

(86) PCT No.: PCT/CN2009/072775
§ 371 (c)(1),
(2), (4) Date: Jan. 14, 2011

(87) PCT Pub. No.: WO2010/006551
PCT Pub. Date: Jan. 21, 2010

(65) Prior Publication Data
US 2011/0116788 A1 May 19, 2011

(30) Foreign Application Priority Data

Jul. 16, 2008 (CN) .......................... 2008 1 0068545

(51) Int. Cl.
*H04B 10/00* (2013.01)
*H04J 14/00* (2006.01)
(52) U.S. Cl.
USPC .............................................. 398/7; 398/83
(58) Field of Classification Search
USPC .................................................... 398/83–85
See application file for complete search history.

(56) References Cited

U.S. PATENT DOCUMENTS

| 5,457,556 | A | * | 10/1995 | Shiragaki ......................... 398/50 |
| 7,680,032 | B1 | * | 3/2010 | Pheiffer et al. ................ 370/222 |
| 2008/0292310 | A1 | | 11/2008 | Li |

FOREIGN PATENT DOCUMENTS

| CN | 1859061 | 11/2006 |
| WO | 2010006551 A1 | 1/2010 |

OTHER PUBLICATIONS

International Search Report for WO 2010/006551 A1 dated Oct. 22, 2009, 4 pgs.

* cited by examiner

*Primary Examiner* — Nathan Curs
(74) *Attorney, Agent, or Firm* — Shumaker & Sieffert, P.A.

(57) ABSTRACT

The present invention discloses a method and a system for shared protection in WDM loop network. The WDM loop network comprises at least one node, and each node is divided into a multiplexing segment layer, a channel layer and a sub-wavelength layer. The method for shared protection comprises the following steps: A, the multiplexing segment layer, the channel layer and the sub-wavelength layer of each node are detected respectively; B, the detection point generates fault information when at least one of the multiplexing segment layer, the channel layer and the sub-wavelength layer goes wrong; and a controller of each node, according to the fault information, determines the protection control state of the present node and notifies the respective executor; wherein the protection control state includes service adding, service passing through, and service dropping; C, the executor of each node controls the corresponding node to switch to the protection control state determined in step B. The present invention realizes the shared protection in sub-wavelength level.

9 Claims, 4 Drawing Sheets

METHOD AND SYSTEM FOR SHARED PROTECTION IN WAVELENGTH DIVISION MULTIPLEXING LOOP NETWORK

FIELD OF THE INVENTION

The present invention relates to the wavelength division multiplexing (WDM) technology, in particular to a method and a system for shared protection in wavelength division multiplexing loop network.

BACKGROUND OF THE INVENTION

With the development of technologies, the application of WDM is gradually converted from long distance aspect to metropolitan area aspect. In the metropolitan area WDM application, because of the open interface, the WDM can directly provide a bearer channel for a plurality of services, such as asynchronous transmission mode (ATM), IP, and synchronous digital hierarchy (SDH) and so on, and consequently there are frequently a plurality of non-SDH services transmitted directly in the wavelength channel. Furthermore, since the bearing capacity of signal wavelength channel becomes increasingly greater from 2.5 Gbit/s to 10 Gbit/s or 40 Gbit/s, the situation of convergence transmission of services in the signal wavelength channel often happens, i.e., a plurality of services, after being converged, occupy a same wavelength channel to perform the transmission.

In urban area WDM application, in order to improve the whole survival performance of the network, a plurality of optical add-drop multiplexing (OADM) sites are generally combined into a loop network, and the survival performance of the WDM loop network is improved through using a protection mode similar to that of SDH loop network. Furthermore, in order to improve the reliability of the network, a protection and recovery method is generally introduced into the WDM system. At present, the most common protection mode in the WDM loop network comprises a client service 1+1 protection and an optical channel shared protection.

The optical channel shared protection means that two wavelengths on two loops of a two-fiber bidirectional loop network are occupied to realize the shared protection of a plurality of inter-segment services, in which the two wavelengths of internal and external loops functions as run and protection for each other. A plurality of inter-segments of the external loop occupy a same wavelength to transmit services, wherein when any one inter-segment is disconnected, the interrupted service can be switched onto the internal loop shared protection channel. Similarly, the reverted working service occupies another wavelength of the internal loop for transmission, and meanwhile the corresponding wavelength of the external loop is used as the shared protection channel thereof Generally speaking, the nodes which take part in the optical channel shared protection need to support three functions: service adding, service passing through and service dropping. The service adding means that when the working channel of the local adding service goes wrong, the service can be switched onto the protection channel to be transmitted; the service passing through means that the protection service of other nodes can pass through this node; and the service dropping means that when the working channel of the local dropping service goes wrong, the service can be switched onto the protection channel.

FIG. 1 shows a general structure of the optical channel shared protection. The client service after being accessed from a convergence unit, is output from the line side of the convergence unit, and then is multiplexed onto the line by a multiplexing unit after passing through a protection switching device; and the de-multiplexing direction is contrary thereto. The input and output of the line side of the convergence unit use the standard wavelength specified by ITU-T.

For the node of the service adding, in normal state, the output of the line side of the convergence unit is connected with the adding interface of the wavelength at the present direction via the protection switching device; and in fault state, the output of the line side of the convergence unit is switched to the adding interface of the wavelength at the other direction. For the node of the service passing through, in normal state, there is no switching operation; and in fault state, the protection channel after being de-multiplexed, is directly connected with the adding interface of the protection channel in the other direction by the protection switching device. The node of the service dropping, in normal state, receives the working channel; and in fault state receives the protection channel in the other direction.

The above-mentioned optical channel shared protection uses a pair of wavelengths as a basic unit, wherein firstly the wavelengths are de-multiplexed on the lines at two directions of east and west by an add-drop multiplexing unit, the wavelengths are processed by the protection switching unit, and then the wavelengths are multiplexed onto the line by the add-drop multiplexing unit. In the scheme, when the channel layer or the multiplexing segment layer goes wrong, effective protection can be provided; however when the convergence unit or the adding service goes wrong, because the working channel and the protection channel are both having fault, effective protection can not be provided.

The client side 1+1 protection which is widely used in practical at present can provide protection for client services, however, since it is not a shared protection mode in principle, it also has the disadvantages by itself, that is, a plurality of wavelengths are required to be occupied when a plurality of inter-segment services on the loop network need protection.

SUMMARY OF THE PRESENT INVENTION

The present invention aims to provide a method to realize shared protection for the sub-wavelength to solve the above-mentioned problem to meet the need of the development of optical transmission technology.

According to one aspect of the present invention, a method for shared protection in wavelength division multiplexing loop network is provided.

The wavelength division multiplexing loop network according to the present invention comprises at least one node, and each node is divided into a multiplexing segment layer, a channel layer and a sub-wavelength layer. The method for shared protection comprises the following steps:

A, respectively detecting the multiplexing segment layer, the channel layer and the sub-wavelength layer of each node;

B, the detection point generating fault information when at least one of the multiplexing segment layer, the channel layer and the sub-wavelength layer goes wrong; and a controller of each node, according to the fault information, determining the protection control state of the node and notifying the respective executor; wherein the protection control state comprises service adding, service passing through, and service dropping;

C, the executor of each node controlling the corresponding node to switch to the protection control state determined in step B.

During the above-mentioned detecting the multiplexing segment layer, it is judged whether the multiplexing segment layer goes wrong according to whether optical power of the multiplexing segment layer exceeds a presetting decision threshold.

During the above-mentioned detecting the channel layer, it is judged whether the channel layer goes wrong according to whether optical power of the channel layer exceeds a presetting decision threshold and/or a specific overhead byte of service frame format of the channel layer.

During the above-mentioned detecting to the sub-wavelength layer, it is judged whether the sub-wavelength layer goes wrong according to whether optical power of the sub-wavelength layer exceeds a presetting decision threshold and/or a specific overhead byte of service frame format of the sub-wavelength layer.

In the above-mentioned method for shared protection, step B is performed by the following steps:

B1, the detection point generating the fault information when at least one of the multiplexing segment layer, the channel layer and the sub-wavelength layer goes wrong, and notifying to a fault related node;

B2, the node controller of the fault related node notifying the fault information to the node controllers of the other nodes through a multicast signaling;

B3, each node controller obtaining the protection control state of the corresponding node through a shared protection switching protocol and notifying to the executor of the corresponding node.

The shared protection switching protocol is performed by the following principles:

for the fault related node, if original state is the service adding, the adding is performed from protection direction; if the original state is the service dropping, then it is switched from selecting the working direction service dropping to selecting the corresponding protection direction service dropping, and the other nodes are service passing through.

According to one aspect of the present invention, a system for shared protection in wavelength division multiplexing loop network is provided.

The system for shared protection in wavelength division multiplexing loop network according to the present invention comprises: at least one node with each node comprising a first add-drop multiplexing unit and a second add-drop multiplexing unit, a first protection service board and a second protection service board, a first working service board and a second working service board, a first optical distributor and a second optical distributor, a first optical cross device and a second optical cross device, a first optical selector and a second optical selector.

The first protection service board and the first working service board are respectively provided with a pair of line side interfaces connected with a first add-drop multiplexing unit and at least one pair of client side interfaces, the second protection service board and the second working service board are respectively provided with a pair of line side interfaces connected with a second add-drop multiplexing unit and at least one pair of client side interfaces, the first optical distributor and the second optical distributor are respectively provided with one input interface and two output interfaces, the first optical cross device and the second optical cross device are respectively provided with two input interfaces and two output interfaces, and the first optical selector and the second optical selector are respectively provided with two input interfaces and one output interface.

The first optical distributor has the input interface connected with an interface of a first local adding service and the output interfaces respectively connected with an input interface of the client side of the first working service board and an input interface of the first optical cross device, and the second optical distributor has the input interface connected with an interface of a second local adding service and the output interfaces respectively connected with an input interface of the client side of the second working service board and one input interface of the second optical cross device.

The first optical cross device has another input interface connected with an output interface of the client side of the first protection service board and the output interfaces respectively connected with an input interface of the client side of the second protection service board and one input interface of the second optical selector, and the second optical cross device has another input interface connected with an output interface of the client side of the second protection service board and the output interfaces respectively connected with an input interface of the client side of the first protection service board and one input interface of the first optical selector.

The first optical selector has another input interface connected with an output interface of the client side of the first working service board and the output interface connected with a first local dropping service interface, and the second optical selector has another input interface connected with an output interface of the client side of the second working service board and the output interface connected with an interface of the first local dropping service, wherein one side of the add-drop multiplexing unit which is connected with line side interfaces of the protection service board or the working service board forms the channel layer, the other side of the add-drop multiplexing unit forms the multiplexing segment layer, the client side of the protection service board or the working service board forms the sub-wavelength layer, and at least one of the multiplexing segment layer, the channel layer and the sub-wavelength layer is provided with a switching detection point.

In the system for shared protection, the detection point of the multiplexing segment layer is arranged at an input interface of the line side of the add-drop multiplexing unit.

In the system for shared protection, the detection point of the channel layer is arranged at an input interface of the line side of the protection service board or the working service board.

In the system for shared protection, the detection point of the sub-wavelength layer is arranged at an input interface of the client side of a source node protection service board or the working service board, or at output interface of corresponding client side of the destination node protection service board or the working service board, or on the first optical cross device or on the second optical cross device which is connected with an output interface of the corresponding client side of the destination node protection service board or the working service board.

The present invention detects the multiplexing segment layer, the channel layer and the sub-wavelength layer respectively, uses the detected fault information to perform protection switching, thus the protection in sub-wavelength level is realized, and the protection to a plurality of sub-wavelength services by using one wavelength and less service convergence units can be realized. At the same time, the present invention does not need to stipulate the wavelength of the convergence unit, and thus, the wavelength can be collocated flexibly as required during multicasting, and the existing network can be updated and optimized conveniently.

Other characteristics and advantages of the present invention will be described in the following specification, and will be apparent partly from the specification and embodiments of the present invention, or will be known through implementing the present invention. The objects and other advantages can be realized and obtained through the structure of the specification, claims, and the drawings.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, wherein.

DETAILED DESCRIPTION

General Description of Functions

The main concept of the present invention is to provide a method for shared protection in wavelength division multiplexing (WDM) loop network. By detecting the multiplexing segment layer, the channel layer and the sub-wavelength layer of each node, the detected fault information is used to perform protection switching, and thus the protection in sub-wavelength level is realized.

The preferable embodiments of the present invention will be detailed hereinafter in connection with the drawings. What should be understood is that the preferable embodiments detailed hereafter are only used to explain and illustrate the present invention, so the preferable embodiments are not limitative of the present invention. If un-conflictive, the embodiments of the present invention and the characteristics thereof can be combined with each other.

As shown in FIG. 2-FIG. 7, in order to explain the present invention clearly and conveniently, the denominations of the device in the figures are different from those of the device mentioned above, which will be explained here at first. The present invention will be detailed hereafter with the denominations as shown in the figures:

a first add-drop multiplexing unit: west add-drop multiplexing unit; a second add-drop multiplexing unit: east add-drop multiplexing unit;

a first optical distributor: optical distributor A; a second optical distributor: optical distributor B;

a first optical cross device: optical switch A; a second optical cross device: optical switch B; a first optical selector: optical switch C; a second optical selector: optical switch D;

a first local service adding interface: west local service adding; a first local service dropping interface: west local service dropping; a second local service adding interface: east local service adding; and a second local service dropping interface: east local service dropping. Wherein, taking the position in FIG. 3 as an example to illustrate the west and east in FIG. 2, for example, as for node A, supposing a person standing in the loop and facing the node A, the left side of the node A is west, and the right side of the node A is east.

Figure 1:
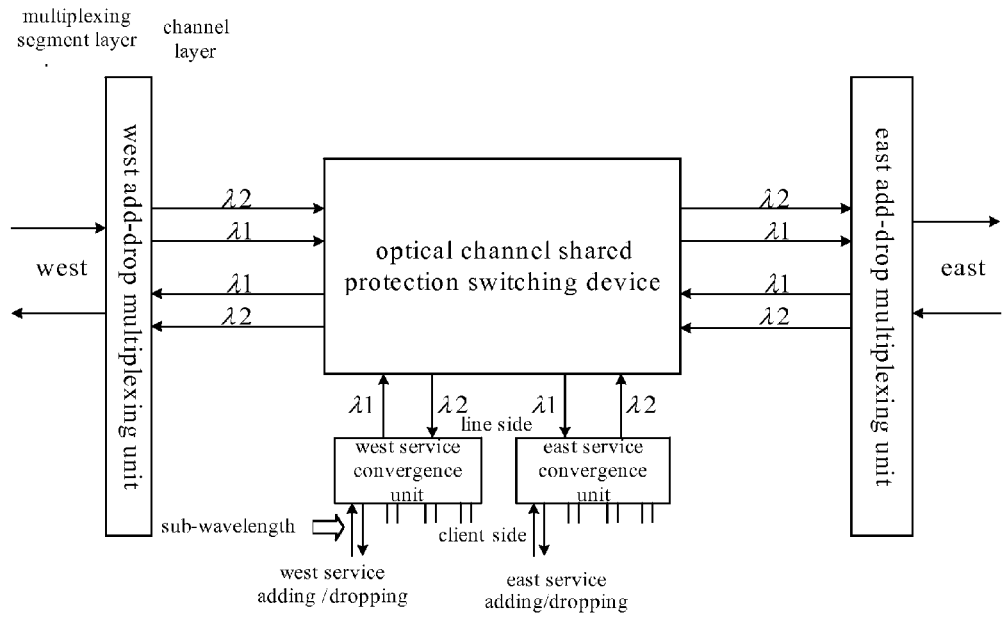
FIG. 1 is a schematic diagram of typical optical channel shared protection in prior art.
Figure 2:
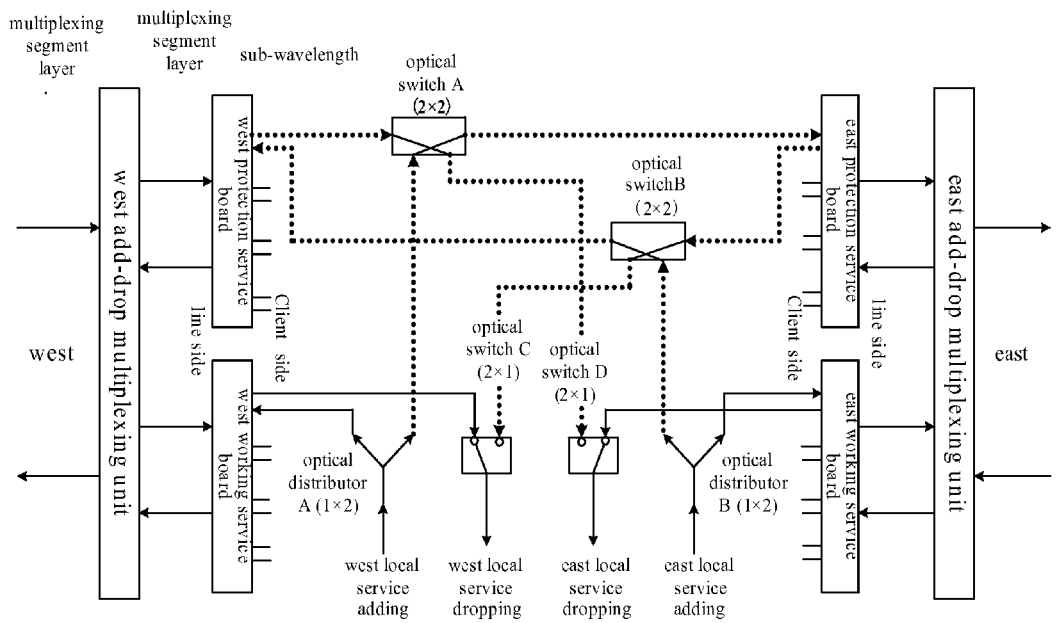
FIG. 2 is a schematic diagram of optical switch state when the sub-wavelength shared protection is in normal state according to the embodiment of the present invention.
Figure 7:
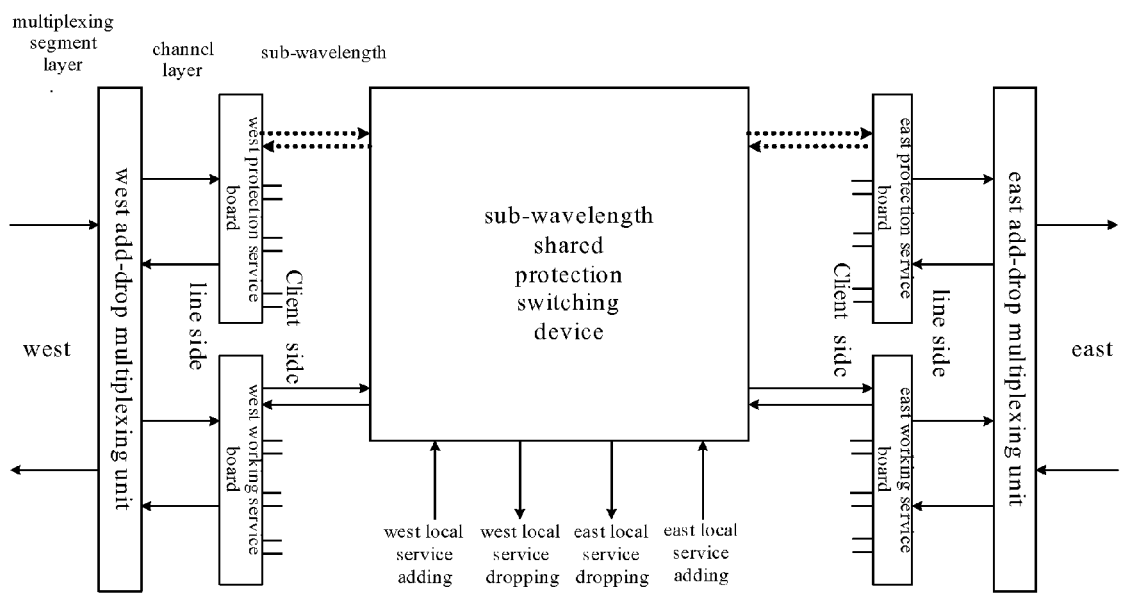
FIG. 7 is an overall schematic diagram of the protection switching device of the sub-wavelength shared protection according to the embodiment of the present invention.

FIG. 7 is an overall schematic diagram of connecting an optical channel shared protection switching device with the service board and the add-drop multiplexing unit in the embodiment of the present invention. Each node in the loop comprises the add-drop multiplexing unit, working service board, and protection service board in two directions (west and east as shown in FIG. 7). The sub-wavelength shared protection switching device is located between the service boards of the two directions. The channel layer is located between the add-drop multiplexing unit and the service board; the multiplexing segment layer is located at the other side (the side far from the sub-wavelength shared protection switching device) of the add-drop multiplexing unit; and the sub-wavelength layer is located at the other side (the side adjacent to the sub-wavelength shared protection switching device) of the service board. As shown in FIG. 2, the service board can realize the convergence function to a plurality of services, and is provided with a pair of line side interfaces connected with the add-drop multiplexing unit and a pair or many pairs of client side interfaces. The type of access service and the number of interfaces at the client side are different depending on the service board types. After being added, the client side services are converged by the service board, and then is output from the line side. The line service uses the standard wavelength to bear. Thus, a plurality of client side services are simultaneously transmitted in one wavelength, therefore it is considered as that each client side service occupies a sub-wavelength of the wavelength. The present invention will discuss how to realize shared protection in a single sub-wavelength.

In urban area network, the two-fiber bidirectional loop network is a widely used topology structure. First, this topology has the characteristics that all the nodes constitute a loop network, with two adjacent nodes connected by two fibers whose transmission direction are opposite, so as to form an internal loop and an external loop with different transmission directions: clockwise direction and counterclockwise direction. Both the internal loop and the external loop have a plurality of wavelengths to transmit. That is to say, a plurality of wavelengths is multiplexed into one fiber to transmit. Each wavelength is called as a channel.

Figure 3:
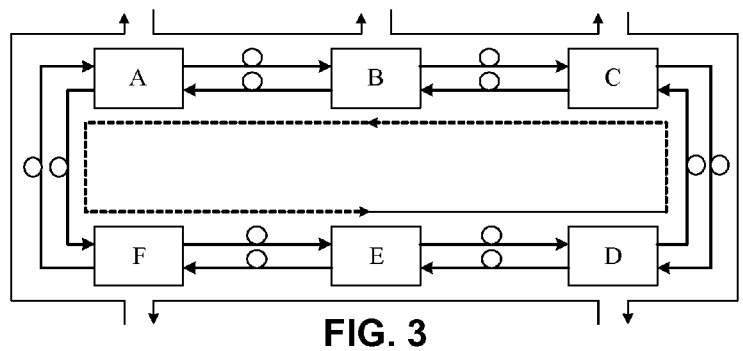
FIG. 3 is a schematic diagram of the service distribution loop network according to the embodiment of the present invention.

FIG. 3 shows a two-fiber loop network which consists of six nodes A, B, C, D, E, F. The external loop is supposed to transmit the working services clockwise which comprise six services: A→B, B→C, C→D, D→E, E→F, and F→A. What needs to be explained is that the difference with the channel of shared protection in prior art is that each service occupies one sub-wavelength. The internal loop services are transmitted counterclockwise (as shown by the dotted line) as the protection of external loop working service. Herein, the word "shared" means that the internal loop service provides the shared protection channel for the external loop services. When any one external loop working service needs to be transmitted through the protection channel, the external loop working service can be switched into the protection channel in the internal loop.

Figure 4:
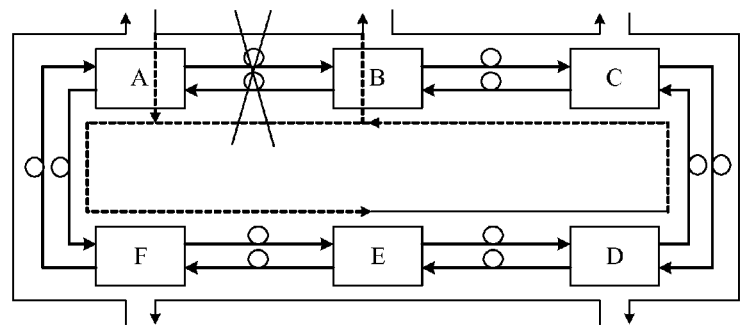
FIG. 4 is a schematic diagram of switching the service to the protection path under fault state according to the embodiment of the present invention.

In FIG. 4, when there is a failure interruption between A and B, the working service of A→B is switched into the internal loop, and the protection path is A→F→E→D→C→B, so that the service is guaranteed not to be interrupted.

It is necessary that the protection switching system can trigger the protection switching only after the detection point detects the fault. The detection points in the present invention can be divided into multiplexing segment level, channel level and sub-wavelength level according to the structure of the system.

The detection point of multiplexing segment level can select an input interface of the line side of the add-drop multiplexing unit and judge whether the multiplexing segment goes wrong or not mainly according to the optical power, and the decision threshold can be set flexibly according to the particular system.

The detection point of channel level can select an input interface of the line side of the service board and judge whether the channel goes wrong or not according to the optical power or the specific overhead byte of service frame format of the line side, and the judgment condition can be selected as one condition or a plurality of conditions occurring at the same time.

The detection point of sub-wavelength level can select an input interface of the client side of source node service board or an output interface of the corresponding client side of the destination node service board, and can also select 2×2 optical switch A or B which is connected with an output interface of the corresponding client side of the destination node service board. At an input interface of the client side of source node service board, it can be judged whether a fault occurs according to the optical power or the fault judgment condition of the particular adding services. At an output interface of the client side of the destination node service board, it can be judged whether the sub-wavelength goes wrong or not according to the specific overhead byte of frame format of the service interface. At the optical switch A or B, it can be judged whether a fault occurs according to the optical power output from the client side of the destination node service board. Since the contents detected by the above-mentioned detection points are different, generally speaking, the protection switching shall be triggered when one of the detection points goes wrong.

When a fault is detected in the sub-wavelength, the channel layer and the multiplexing segment layer, the switching controller of the present node will be notified. After the controller receives fault information sent by the detection point, the controller notifies the fault information to the controllers of the other nodes through the multicast signaling of individual nodes in a protection group (comprising all the nodes which take part in the shared protection). The controllers of individual nodes in the protection group obtain, through the shared protection switching protocol, the protection control state thereof which generally comprises that the source node is switched eastward or westward, the middle node is in the passing through state; and the destination node is switched westward or eastward. The control state is that the controller sends switching information the executor to notify the executor to execute an order of switching or passing through. In the present embodiment, the executor is the four optical switches of each node.

After receiving the system switching or recovery command, the executor changes the connection relationship of the client interfaces. The harmonious switching of the whole network allows that all the paths of the whole backup or working service are communicated, and the service can be switched onto corresponding path.

At the transmitting side of the source node of the fault service (taking the transmission of east service as an example), the local east adding service is divided into two parts by the optical distributor: one part is transmitted to an input interface of the east working client, and the other part is transmitted to an input interface of the west backup client. The transmission of west service is similar to the transmission of east service.

At the receiving side of the destination node of the fault service (taking the reception of west service as an example), the local west dropping service can select one from the two interfaces to receive signals. The system command sent down by the protection switching controller determines receiving the signal of west working client output interface or the signal of east backup client interface. The reception of east service is similar to the reception of west service.

At the passing through node (taking the direction of west→east as an example), the system command determines communicating the west backup service output interface to the east backup client input interface, or communicating the local west adding backup signal to the east back client input interface, or west backup client output interface to the local east dropping backup interface. The processing of east→west backup services is similar to the processing of west→east backup services.

The optical distributors A and B both use the 1×2 (one-divided-two) optical distributor, respectively having one input interface and two output interfaces. The input interface of the optical distributor A is connected with the west local adding service, and the output interfaces are respectively connected with the west working client side interface and the optical switch A leading to the east protection client interface. The connection of the optical distributor B is similar to the connection of the optical distributor A.

The optical switches A and B are both the 2×2 optical switch, respectively having two input interfaces and two output interfaces. The input interfaces of the optical switch A are respectively connected with the west protection client interface and one interface of the optical distributor A; and the output interfaces thereof are respectively connected with east protection client interface and the protection input interface of the optical switch D. The connection of the optical switch B is similar to the connection of the optical switch A.

The optical switches C and D are both the 2×1 optical switch, having two input interfaces and one output interface. The input interfaces of the optical switch C are respectively connected with the west working client interface and the optical switch B; and the output interface is connected with the west local dropping service. The connection of the optical switch D is similar to the connection of the optical switch C.

In normal state, switching and passing through occur to none of the network element, and the state of the optical switch is as shown in FIG. 2. The optical distributors A and B are concurrent in any state. The optical switches A and B are in crossing state. For the optical switch A, the protection of the west adding service is crossed to the east protection client interface, and the west protection client interface is crossed to the protection of the east dropping service. For the optical switch B, the protection of the east adding service is crossed to the west protection client interface, and the east protection client interface is crossed to the protection of the west dropping service.

Figure 5:
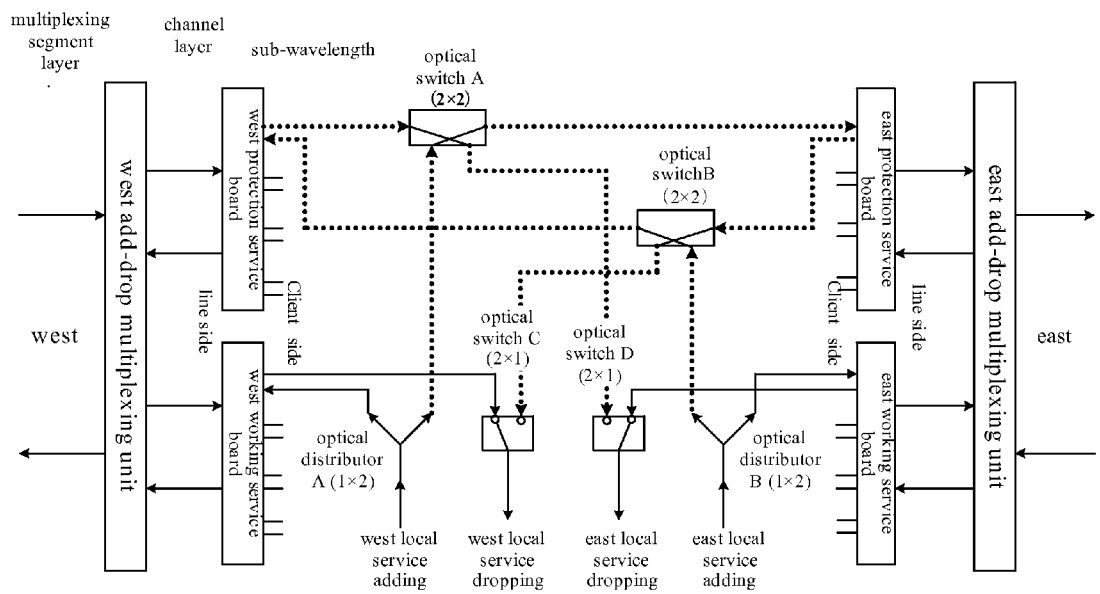
FIG. 5 is a schematic diagram of optical switch state of passing-through node when the sub-wavelength shared protection is in fault state according to the embodiment of the present invention.
Figure 6:
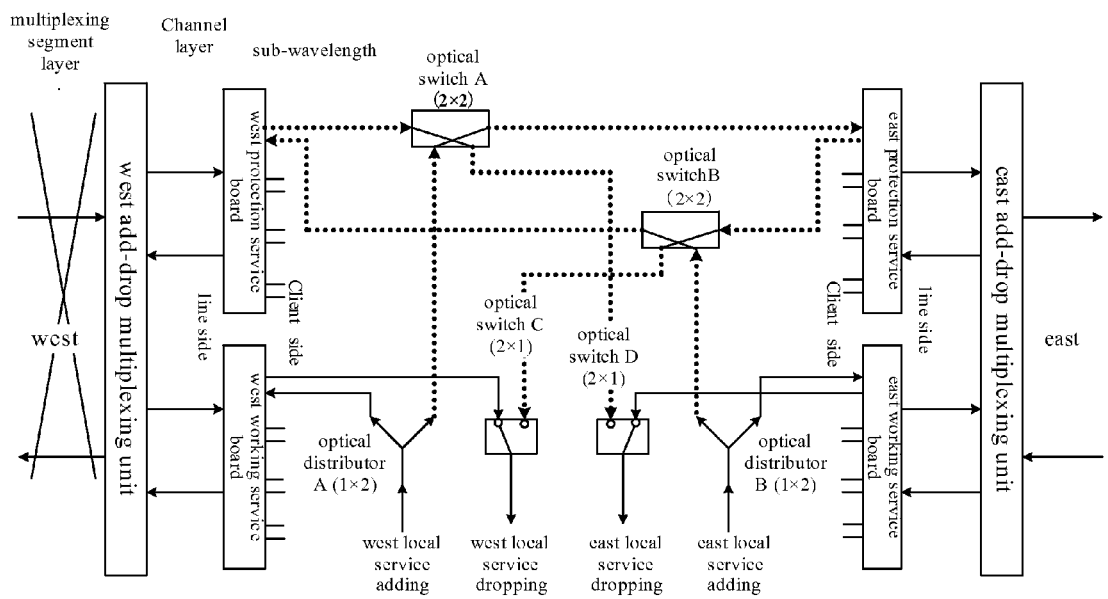
FIG. 6 is a schematic diagram of optical switch state of destination node when the west part of the sub-wavelength shared protection is in fault state according to the embodiment of the present invention.

In switching state, according to a particular fault situation, the states of the four optical switches partly or entirely changes, so that the corresponding service protection channel from the source node to the destination node via the passing through node is established. For the source node, all the optical switch states keep unchanged, and the adding service passes through an optical distributor and then passes through the 2×2 optical switch to be crossed to the protection client interface. For the passing through node, if the transmission direction of the service at the present node is from west to east, the state of the optical switch A is changed to that the west protection client output interface is crossed to the east protection client input interface; and if the transmission direction of the service at the present node is from east to west, the state of the optical switch B is changed to that the east protection client output interface is crossed to the east protection client input interface, as shown in FIG. 5. For the destination node, if a west fault happens, the state of the optical switch C is changed to receive the east protection service from the optical switch B, as shown in FIG. 6; and if a east fault happens, the state of the optical switch D is changed to receive the west protection service from the optical switch A.

The detailed process of how to realize the sub-wavelength shared protection function in the system will be detailed hereafter according to an example.

According to the shared protection principle, it is known that the loop network switching result shall be as shown in FIG. 3. Taking the service A→B as an example, the service switching protection path is A→F→E→D→C→B, and the nodes F, E, D, and C are orderly in passing through state. What needs to be explained is that according to the shared protection principle, generally, the services are bidirectionally transmitted and the switching is bidirectional simultaneous switching. Herein, in order to describe the example conveniently, the present invention only explains service protection switching in one direction.

When a fault happens between the nodes A and B, an output interface of the west working client side of the node B detects the fault and notifies to the protection switching controller of the node B (what shall be noticed is that the channel and the multiplexing segment layer can also be used as the detection point, and the description here only takes the sub-wavelength fault detection point as an example). After receiving the fault information, the controller of node B multicasts to the controllers of the other node in the protection group via a monitoring channel. Each node calculates the protection control state of the present node according to the shared protection switching protocol.

In the present example, the state of source node A is east switching, and all the optical switches have not state switching. The east adding service passes through the optical distributor B after being added in the east of the node A; and the protection path is added from the corresponding branch of the west protection service board after being selected by the optical switch A. The nodes F, E, D and C are in the passing through state. Since the service protection path A→B is from east to west (counterclockwise in the internal loop), the controller should be in the state that the optical switch B is converted to connect the east protection output client interface with the west protection input client interface. The state of destination node B is west switching. The optical switch C is converted to receive the east protection client output interface. In this case, the protection path is connected completely, and the services are switched to the protection path successfully.

The process of switching recovery of the service is similar to that of the switching. When the fault disappears, the detection point will also notify the controller. After multicasting the information, the controller instructs the executor to switch back to normal state.

The present invention has the following beneficial effects:

1, Compared with the optical channel shared protection technology, the present invention realizes the sub-wavelength level protection for specific sub-wavelength. That is to say, when the specific sub-wavelength goes wrong, the present invention can realize the protection switching, without the influence on the service transmission of the other sub-wavelengths.

2, In the client service 1+1 protection which is widely used at present, when a plurality of client services between the different nodes of a same wavelength needs to be protected, a plurality of wavelengths and many pairs of service convergence units have to be occupied. While using the shared protection realization method provided by the present invention, the service protection of a plurality of sub-wavelengths can be realized by using only one wavelength and less service convergence units.

3, In addition, compared with the optical channel shared technology, the present invention does not need to stipulate the wavelength of the convergence unit. Thus, the wavelength can be configured flexibly as required during multicasting, and the existing network can be updated and optimized conveniently.

The descriptions above only provide further detailed explanation to the present invention with the specific preferable embodiments, and the preferable embodiments of the present invention are not restricted to those explanations only. For those common skilled in the art, the present invention may have various simple deductions and substitutions. Any simple deductions and substitutions etc. without deviating from the concept of the present invention are all concluded in the protection scope of the present invention.

The invention claimed is:

1. A shared protection method in a wavelength division multiplexing (WDM) loop network, wherein the WDM loop network comprises at least one node, and each node is divided into a multiplexing segment layer, a channel layer and a sub-wavelength layer, and the shared protection method comprises:

A, respectively detecting the multiplexing segment layer, the channel layer and the sub-wavelength layer of each node;

B, generating, with a detection point, fault information when at least one of the multiplexing segment layer, the channel layer and the sub-wavelength layer goes wrong and determining, with a controller of each node, a protection control state of the present node according to the fault information and notifying a corresponding executor, wherein the protection control state comprises service adding, service passing through, and service dropping; and C, controlling, with the executor of each node, the corresponding node to switch to the protection control state determined in step B, wherein the step B is performed by the following steps:

B1, the detection point generating the fault information when at least one of the multiplexing segment layer, the channel layer and the sub-wavelength layer goes wrong, and notifying to a fault related node;

B2, a node controller of the fault related node notifying the fault information to the node controllers of the other nodes through a multicast signaling; and B3, each node controller obtaining the protection control state of the corresponding node through a shared protection switching protocol and notifying an executor of the corresponding node.

2. The shared protection method according to claim 1, wherein during detecting the multiplexing segment layer, whether the multiplexing segment layer goes wrong is judged according to whether an optical power of the multiplexing segment layer exceeds a presetting decision threshold.

3. The shared protection method according to claim 1, wherein during detecting the channel layer, whether the channel layer goes wrong is judged according to whether an optical power of the channel layer exceeds a presetting decision threshold and/or a specific overhead byte of a service frame format of the channel layer.

4. The shared protection method according to claim 1, wherein during detecting the sub-wavelength layer, whether the sub-wavelength layer goes wrong is judged according to whether an optical power of the sub-wavelength layer exceeds a presetting decision threshold and/or a specific overhead byte of a service frame format of the sub-wavelength layer.

5. The shared protection method according to Claim 1, wherein the shared protection switching protocol is performed according to following principles:
for the fault related node, if the original state is service adding, then adding from the protection direction; if the original state is service dropping, then switching from selecting a working direction to be service dropping to selecting a corresponding protection direction to be service dropping, and the other nodes are selected to be service passing through.

6. A shared protection system in wavelength division multiplexing (WDM) loop network, comprising at least one node with each node comprising a first add-drop multiplexing unit, a second add-drop multiplexing unit, a first protection service board, a second protection service board, a first working service board, a second working service board, a first optical distributor, a second optical distributor, a first optical cross device, a second optical cross device, a first optical selector and a second optical selector,
wherein the first protection service board and the first working service board respectively has a pair of line side interfaces connected with the first add-drop multiplexing unit and at least one pair of client side interfaces, the second protection service board and the second working service board respectively has a pair of line side interfaces connected with the second add-drop multiplexing unit and at least one pair of client side interfaces, the first optical distributor and the second optical distributor respectively has one input interface and two output interfaces, the first optical cross device and the second optical cross device respectively has two input interfaces and two output interfaces, and the first optical selector and the second optical selector respectively has two input interfaces and one output interface,
wherein the input interface of the first optical distributor is connected to a first local adding service interface and the output interfaces are respectively connected to a client side input interface of the first working service board and an input interface of the first optical cross device, and the input interface of the second optical distributor is connected to a second local adding service interface and the output interfaces are respectively connected to a client side input interface of the second working service board and an input interface of the second optical cross device,
wherein the other input interface of the first optical cross device is connected client side output interface of the first protection service board and the output interfaces are respectively connected to client side input interface of the second protection service board and an input interface of the second optical selector, and the other input interface of the second optical cross device is connected to client side output interface of the second protection service board and the output interfaces are respectively connected to client side input interface of the first protection service board and an input interface of the first optical selector, and
wherein the other input interface of the first optical selector is connected to client side output interface of the first working service board and the output interface is connected to a first local dropping service interface, and the other input interface of the second optical selector is connected with client side output interface of the second working service board and the output interface is connected the first local dropping service interface, wherein one side of add-drop multiplexing units which is connected to line side interfaces of protection service boards or working service boards forms a channel layer, the other side of the add-drop multiplexing units forms a multiplexing segment layer, client side of the protection service boards or the working service boards forms a sub-wavelength layer, and a switching detection point is set at least one of the multiplexing segment layer, the channel layer and the sub-wavelength layer.

7. The shared protection system according to claim 6, wherein the detection point of the multiplexing segment layer is set at an input interface of line side of the add-drop multiplexing units.

8. The shared protection system according to claim 6, wherein the detection point of the channel layer is set at an input interface of line side of the protection service boards or the working service boards.

9. The shared protection system according to claim 6, wherein the detection point of the sub-wavelength layer is set at an input interface of client side of a source node protection service board or the working service boards, or at an output interface of corresponding client side of a destination node protection service board or the working service boards, or at the first optical cross device or the second optical cross device which is connected to an output interface of corresponding client side of the destination node protection service board or the working service boards.

* * * * *